Patented Feb. 22, 1938

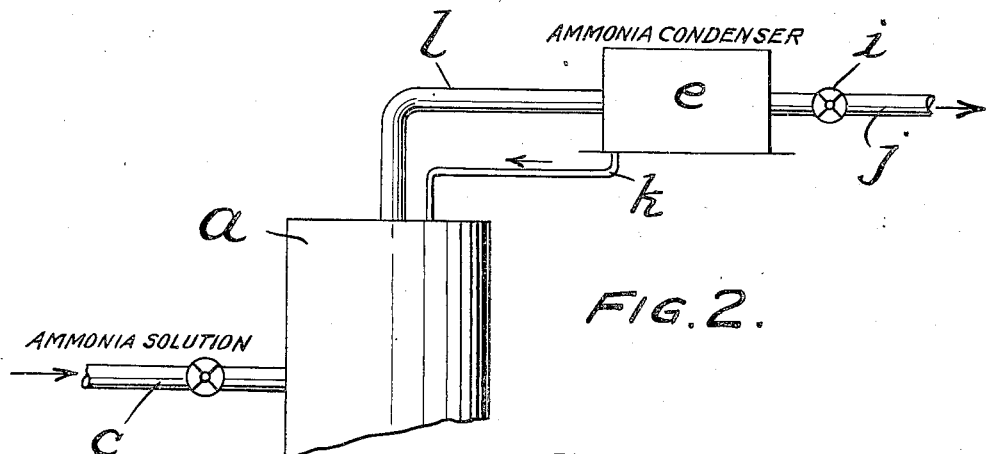
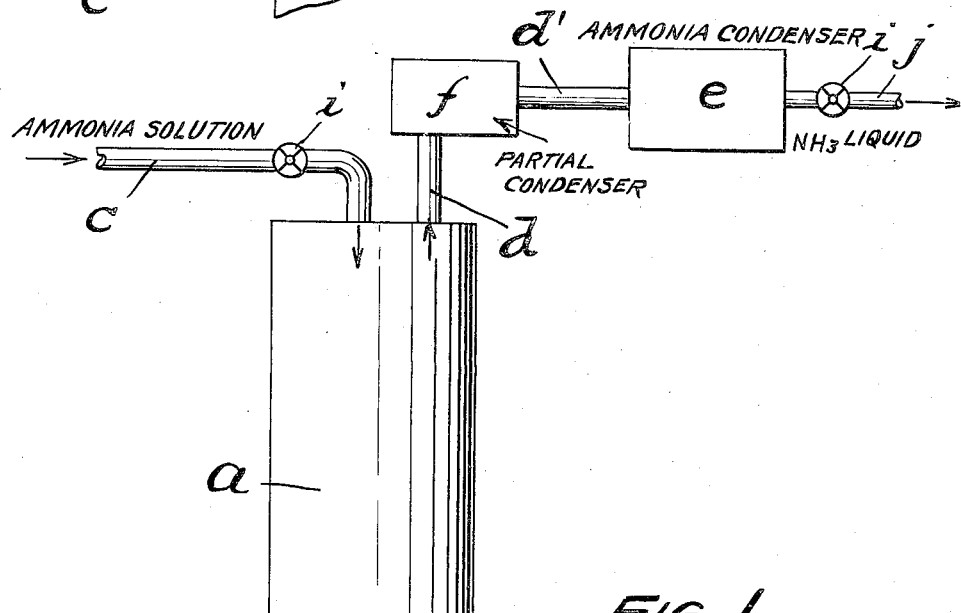
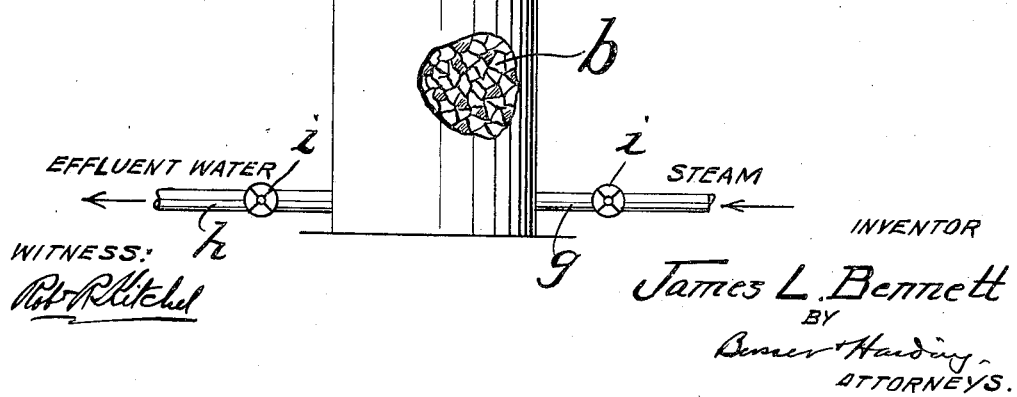

2,108,914

UNITED STATES PATENT OFFICE 2,108,914

METHOD OF CONCENTRATING AQUEOUS AMMONIA SOLUTIONS

James L. Bennett, Wilmington, Del., assignor to Hercules Powder Company, Wilmington, Del., a corporation of Delaware Application May 1, 1935, Serial No. 19,192

2 Claims. (Cl. 202—51)

This invention relates to a method of concentrating aqueous ammonia. More particularly, this method relates to enriching an aqueous ammonia solution by increasing its content of ammonia gas, without any intermediate steps of removal of ammonia from the solution and redissolving ammonia gas in water.

As is well known, ammonia is obtained from distillation of coal, to produce illuminating gas among other things. In such operation, ammonia is obtained as a weak solution of ammonia in water. The concentration of ammonia in such solution, frequently called aqua ammonia, varies, but may run as high as 26–30% $NH_3$. Ammonia is also produced by synthesis, and such synthetic ammonia may also be absorbed in water to form an aqua ammonia of similar concentration. The reason for the limiting concentration of 20–30% is the limiting solubility of $NH_3$ in water at ordinary temperatures and pressures. For example, when ammonia is passed into water at room temperature, or even slightly lower temperature, and atmospheric pressure, practically speaking, no more ammonia will be absorbed by the water after a concentration of 26–30% is reached.

Such aqua ammonia solutions are used as a source of ammonia variously, e. g., in the preparation of ammonium nitrate for explosive purposes, as a source of anhydrous ammonia such as described in my co-pending application 591,916, etc., but it is obvious that to remove the ammonia from such solutions, e. g., by boiling, suitable provision must be made to remove the moisture carried by the ammonia gas, and also, freight must be paid not only on the 30% ammonia content of such aqua ammonia but upon the 70% of water contained in such solution.

While is is true that such freight on water could be obviated by shipping anhydrous ammonia, nevertheless, to ship anhydrous ammonia, exceptionally strong, heavy, expensive containers therefor must also be shipped, e. g., steel cylinders, high-pressure, insulated tank cars, etc., so that another disadvantage arises.

Heretofore, no method has been known to concentrate a given aqueous ammonia solution. The only approach thereto has been to heat the aqua ammonia to a temperature sufficient to drive off all the ammonia gas, together with some of the water, by suitable reflux condensers, strip off the moisture content and return same to the boiler, thus obtaining dry ammonia gas, which can then be dissolved in another portion of water to form an aqueous solution of ammonia of the desired concentration. This process, as will be appreciated, is not a process of concentrating the original aqua ammonia.

In accordance with my invention I concentrate an aqua ammonia solution of any concentration to any other higher concentration, without the steps of removing from the original aqua ammonia the ammonia and, in part, the moisture, in a simple and economical manner, and, at the same time, purify the solution of any non-volatile impurities which might be injurious to any use to which it may be put. By such concentration I reduce materially the amount of water upon which freight must be paid in shipment of same.

In accordance with my invention it has been found that if a solution of ammonia in water, such as is obtainable from illuminating gas purification plants, and containing more or less non-volatile impurities, is passed down a suitably packed tower under pressure, in counterflow with steam under pressure, with suitable reflux as described below, ammonia and water will be separated from the solution in proportions dependent upon pressure and temperature conditions, as more fully desscribed in the examples following, and may be condensed by a condenser to produce an ammonia solution of higher ammonia concentration than the original ammonia solution, and free from harmful non-volatile impurities.

Having thus indicated in a general way the nature and purpose of this invention, I shall proceed to describe a practical adaptation of the method in detail in connection with description of suitable forms of apparatus with reference to the accompanying drawing, in which:

Figure 1 represents diagrammatically forms of apparatus adaptable for use in carrying out the method, and Figure 2 represents diagrammatically a modified form of the apparatus shown in Figure 1.

With reference to the drawing in Figure 1, $a$ indicates a tower of suitable height and diameter, e. g., a height of 40 feet and a diameter of 14 inches. The tower is packed with any suitable, inert packing material $b$, such as pieces of quartz, or porcelain rings. A conduit $c$ enters the tower at or near its top, and is adapted to discharge into the tower aqueous ammonia solution under pressure. The aqueous ammonia solution may be drawn from any suitable storage vessel, and will be discharged into the tower under suitable pressure by means of any suitable pump. A pipe $d$ enters the tower at or near the top and is adapted to carry from the tower the separated ammonia and water vapor and for return of condensate. Pipe $d$ leads to a suitably cooled condenser $f$, in which the ammonia gas and water vapor, discharged from the top of the tower under pressure, will be partially liquefied. Pipe $d'$ passes to condenser $e$, in which the mixture of ammonia gas and water vapor which pass through condenser $f$, will be condensed to a solution of ammonia in water. The preliminary condenser $f$ is so arranged that the condensate from the partial condensation of water vapor and ammonia will flow back into the tower as reflux.

Pipe $g$ enters the tower at or near its bottom, and is adapted to discharge into the tower steam under pressure. Pipe $h$ enters the tower at or near its bottom and is adapted to discharge from the tower effluent water free from ammonia, but containing non-volatile impurities originally contained in the ammonia solution fed into the top of the tower.

Suitable valves, $i$, serve to control the flow of ammonia solution, steam, and effluent.

Liquid ammonia solution may be discharged from condenser $e$ through a valved conduit $j$ and stored for such use as may be intended, or used directly for shipment, or used directly for the manufacture of ammonium nitrate by mixing with nitric acid in a vessel adapted to the purpose.

In carrying out the method in accordance with this invention, the aqueous ammonia solution and the steam may be introduced into the tower under a pressure suitable to produce the desired ammonia concentration in the condensate, as will be more fully described in the examples following. The system, including the tower and condenser, is a closed system, and the pressure at which the aqueous ammonia solution and steam are introduced into the tower will be substantially the same throughout the system. The effluent water is discharged under pressure.

As a specific illustration of the practical adaptation of this invention utilizing the apparatus described, for example aqueous ammonia solution containing 26-30% $NH_3$ is introduced into the top of the tower $a$ through pipe $c$ under an absolute pressure of 82.55 lbs. per square inch, and steam is introduced into the bottom of the tower under an absolute pressure of 82.55 lbs. per square inch. The ammonia solution and steam will counterflow through the tower. The steam will cause the ammonia and some of the water to be boiled out of the aqueous ammonia solution in the form of gas and vapor, both of which will escape from the tower under pressure through pipe $d$. The ammonia gas and water vapor will pass through the preliminary condenser, in which any excess water vapor will be condensed and returned, with some ammonia in it, to the tower. The rest of the ammonia gas and water vapor then pass to the final condenser, where it is cooled to 80° F. by sufficient water at that temperature or lower. At this temperature (80° F.) and pressure (82.55 lbs. absolute) the mixture of ammonia gas and water vapor will condense to a liquid comprising a solution of ammonia gas in water and having an ammonia concentration of about 58.62%.

Similarly, to prepare a concentrated aqueous ammonia solution containing 73.91% ammonia, I may feed into the top of the tower 26-30% aqueous ammonia solution under a tower pressure of 116.54 lbs. absolute, feed in steam at the bottom so as to maintain such pressure, cool the final condenser to a temperature of 80° F., and obtain from the final condenser concentrated, aqueous ammonia solution containing 73.91% ammonia.

Similarly, to prepare a concentrated, aqueous ammonia solution containing 84.26% ammonia, I may feed into the top of the tower 16-20% aqueous ammonia solution under a tower pressure of 130.64 lbs. absolute, feed in steam at the bottom so as to maintain such pressure, cool the final condenser to a temperature of 80° F., and obtain from the final condenser a concentrated, aqueous ammonia solution containing 84.26% ammonia.

Naturally, I do not limit myself to any of the above specific temperatures, pressures, and concentrations, but may vary either or both to obtain the desired concentration of ammonia in the condensate.

If desired, in carrying out the method in accordance with this invention, the preliminary condenser $f$ may be omitted. As illustrative of procedure and of a satisfactory form of apparatus where the preliminary condenser $f$ is omitted, reference is made to Figure 2, from inspection of which it will be noted that, with elimination of the preliminary condenser, the aqueous ammonia solution is fed into the tower $a$ at a point below the top of tower $a$, e. g., at a point about 20% below the top of the tower, and the ammonia gas and water vapor leaving the tower are led directly to the condenser $e$ through pipe $j$, and provision is made for return from conduit $k$ to the top of tower $a$ of some condensate from condenser $e$. In carrying out the procedure in accordance with this invention, using, for example, the apparatus shown in Figure 2, the condensate reflux returned to the top of tower $a$ from condenser $e$ will be somewhat cooled and will operate to cause a partial condensation out of the gas and vapor about to leave the tower of some of the water vapor contained therein.

It will be understood that the practical adaptation of the method embodying this invention is independent of any particular form of apparatus, the apparatus illustrated and described in connection with the method being shown merely for purposes of illustration.

What I claim and desire to protect by Letters Patent is:

1. The method of concentrating aqueous ammonia solutions which includes continuously introducing a relatively dilute aqueous ammonia solution under pressure into the upper portion of a tower, introducing steam under pressure into the lower portion of the tower and in direct contact with said aqueous ammonia solution, whereby the aqueous ammonia solution and the steam pass in countercurrent flow through the tower, passing said aqueous ammonia solution and said steam through said tower at such a rate that substantially all of the ammonia is stripped from the solution before the solution reaches the lower portion of the tower, withdrawing the stripped solution from the lower portion of the tower, withdrawing ammonia gas and water vapor from the upper portion of the tower, passing the ammonia gas and water vapor into a condenser and therein condensing said ammonia gas and water vapor to produce a concentrated aqueous ammonia solution, while continuously maintaining a pressure in the tower and condenser which is above about 82 lbs./sq. inch absolute and thereby producing a concentrated aqueous ammonia solution containing more than 58% ammonia in the condenser, and withdrawing said concentrated aqueous ammonia solution from the condenser.

2. The method of concentrating aqueous ammonia solutions which includes continuously introducing a relatively dilute aqueous ammonia solution under pressure into the upper portion of a tower, introducing steam under pressure into the lower portion of the tower and in direct contact with said aqueous ammonia solution, whereby the aqueous ammonia solution and the steam pass in countercurrent flow through the tower, passing said aqueous ammonia solution and said steam through said tower at such a rate that substantially all of the ammonia is stripped from the solution before the solution reaches the lower portion of the tower, withdrawing the stripped solution from the lower portion of the tower, withdrawing ammonia gas and water vapor from the upper portion of the tower, passing the ammonia gas and water vapor into a condenser and therein condensing said ammonia gas and water vapor to produce a concentrated aqueous ammonia solution, while continuously maintaining a pressure in the tower and condenser which is between about 82 and about 131 lbs./sq. inch absolute and thereby producing a concentrated aqueous ammonia solution containing between about 58% and about 85% ammonia in the condenser, and withdrawing said concentrated aqueous ammonia solution from the condenser.

JAMES L. BENNETT.